June 3, 1930. J. ZUBATY 1,761,951
TEMPERATURE COMPENSATOR
Filed April 8, 1927

Inventor
Joseph Zubaty
By Blackmore, Spencer & Hush
Attorneys

Patented June 3, 1930

1,761,951

UNITED STATES PATENT OFFICE

JOSEPH ZUBATY, OF FLINT, MICHIGAN, ASSIGNOR TO A C SPARK PLUG COMPANY, OF FLINT, MICHIGAN, A COMPANY OF MICHIGAN

TEMPERATURE COMPENSATOR

Application filed April 8, 1927. Serial No. 182,077.

This invention relates to magnetic measuring instruments, in particular to speedometers used on vehicles to indicate the rate of travel.

It is well-known that errors occur in the readings of such instruments owing to temperature changes. This is due to the fact that at low temperatures the resistance of the speed cup is low and that the eddy currents set up in the rim of the cup are quite large, with the result that the speed indications are larger than the true value. As temperature increases the reverse action takes place until at high temperatures the indications of speed will be lower than the true value. The correction of such errors has been undertaken by the use of a movable magnetic mass, the position of which is controlled by a bi-metallic thermostat.

By this invention it is intended to correct the inaccuracies in the readings of the instrument and to render the readings correct at all temperatures by the use of a shunt of variable conductivity, the shunt consisting of a fixed member associated with the magnet, the variable effect of the shunt upon the active magnetic field being due to inherent characteristics of the fixed member.

For a full understanding of the invention reference is made to the following description and to the accompanying drawing.

Figure 2:
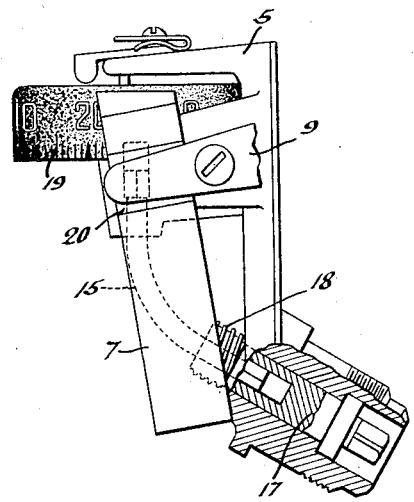
Figure 2 is a side elevation partly in section.

Referring by reference characters to the drawing, numeral 5 represents a frame carrying mounted thereon a magnet 7. Clamps 9 are employed to secure the magnet to the frame. At 11 is shown a surrounding metallic casing. Rotatably mounted within the poles of the magnet is a rotor 13 driven by a flexible drive shaft 15 in the illustrated embodiment of the invention. Figure 2 shows a drive shaft 17 for operating the flexible shaft having portions for connection with the flexible shaft 15 within the speedometer and for connection with the external shaft driven by the part, the speed of which is to be measured. It will also be seen that the shaft 17 carries a gear 18 for operating the odometer, not shown, which, as usual, is used together with the speedometer. Surrounding the rotor 13 is a speed cup 19 also located in the magnetic field between poles of magnet 7. At low temperatures the speed cup resistance is low and the eddy currents set up in the rim of the speed cup by the lines of force between the magnet and the rotor are large, this resulting in an unduly high speedometer reading. The opposite condition prevails when the temperature is high.

Nickel copper alloy has a large magnetic permeability factor at low temperatures, which factor decreases with rising temperature. It is proposed to make use of such an alloy to off-set the errors noted above. To that end clamps 9 hold, not only the magnet 7, but also a plate of nickel copper alloy which is of somewhat U-shape and extends outwardly to a position adjacent the casing 11. This plate is designated by numeral 20. Such a plate may be used adjacent one or both magnet poles.

The result of the use of such a plate will be obvious. The plate in and of itself, but preferably with the aid of the casing, constitutes a shunt, the effect of which, owing to the above mentioned characteristics of the alloy, is such as to correct the errors otherwise occuring in the readings of the speed cup. This result is accomplished without the use of movable parts as heretofore proposed, the movement of said parts having been made sometimes manually and sometimes automatically through the instrumentality of a bi-metallic thermostat. By the simple expedient of attaching a piece of this nickel copper alloy I am able to render the readings of the structure correst for all temperatures.

Figure 3:
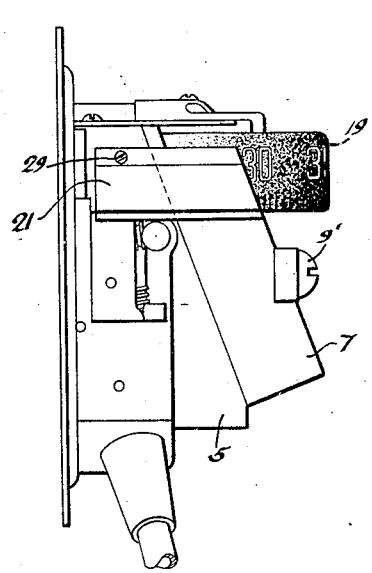
Figure 3 is a side view of a modified form.
Figure 4:
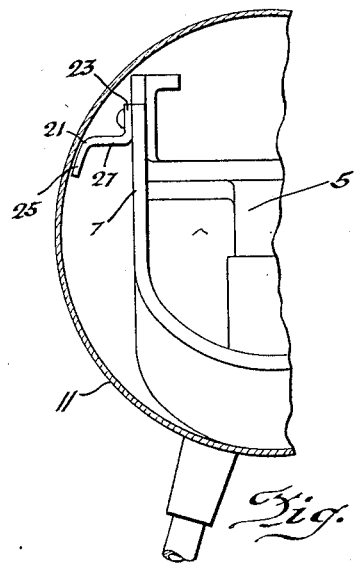
Figure 4 is a view in elevation of a form shown by Figure 3.

Figures 3 and 4 show a different shape of correcting plate. The nickel copper alloy plate 21 is shaped as shown to engage the magnet 7 adjacent its pole with one face 23, another face 25 being in position adjacent the casing as before, there being an intermediate connecting portion 27. In this form it may be convenient to secure the plate 21 by screws 29 to the frame 5, inasmuch as the magnet holding clamp 9' engages the magnet in a way which renders it less convenient to use this clamp for also holding the nickel copper alloy plate. The operation of the temperature compensator is the same as in the form of the invention previously described.

Two practical embodiments have been shown and described. These are the two forms which I now consider best, but it will be understood that these should be regarded as illustrative, and that other forms may be adopted to carry out the inventive idea.

Certain characteristics common to these two forms may be mentioned. In both forms there is the usual effective magnetic field between the magnet poles. In each case some of the lines of force may pass from pole to pole by way of a shunt. This shunt might be an air passage, but it is preferable to use a metal casing to render the shunt more serviceable. The air gap between each magnet pole and the casing prevents any excessive shunt action. The two air gaps provide very desirable positions for the compensator. It is possible to use a compensator in one only of these gaps, or one may be used in each gap according to the degree of compensation required.

Figure 1:
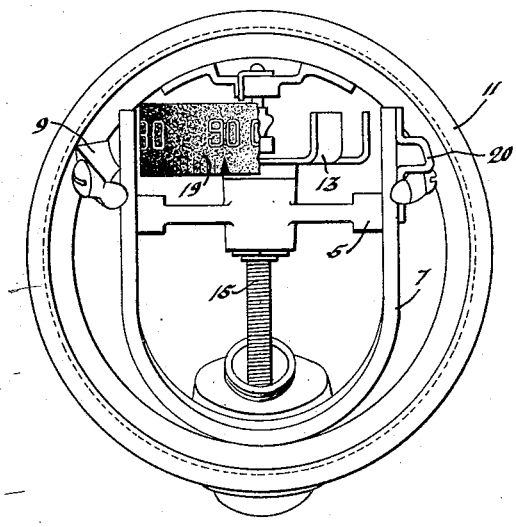
Figure 1 is a front elevation of a magnetic speedometer, parts being removed.

Compensators made according to either design shown offer a large area for magnetic flux transmission from the compensator to the casing. In Figure 1 the base of the U-shaped member, and in Figure 4 the part represented by numeral 25, constitute the areas referred to. With compensators of the movable type operated by bimetallic thermostats, for example, the size of the compensator must not be so great as to exceed the limits imposed by the operating thermostats. In the case of the fixed compensators of the kind herein described, no such limitations are required. The portion 25, for example, may be made as large as it needs to be to properly correct for errors due to temperature changes. Great accuracy thus becomes possible.

In both forms the compensator is shown as positioned adjacent the magnet pole with an air gap between the compensator and the casing. Obviously the compensator might be positioned to locate the gap between the magnet and itself. This might be done, for example, by attaching the compensator to the casing instead of to the magnet or to the magnet frame, as in the drawing. Also, the compensator might be positioned mid-way between the magnet and the casing, and thus divide the gap into two parts.

Other changes will doubtless be discovered, changes which may be made in detail without departing from the spirit of the invention.

I claim:

1. In combination, a magnet, an indicating member in the active field between the poles of the magnet, said indicating member having electrical conductivity variable with temperature, a magnetic shunt distinct from the active field, there being an air gap in said shunt, and a compensating member having magnetic permeability variable with temperature changes positioned in said gap of the shunt.

2. In combination, a magnet, a casing inclosing said magnet, said magnet having an active field between its poles and a shunt field including said casing, there being an air gap between said poles and said casing within said shunt, a rotary indicating member in the active field, said rotary indicating member having electrical conductivity variable with temperature changes and a compensating alloy member having magnetic permeability variable with temperature changes, said conpensator being located in the shunt gap.

In testimony whereof I affix my signature.

JOSEPH ZUBATY.